United States Patent
Schreiner et al.

(10) Patent No.: US 11,010,212 B2
(45) Date of Patent: May 18, 2021

(54) SYSTEM AND METHOD FOR SUPPORTING AND NEGOTIATING MULTIPLE API VERSIONS ACROSS MULTIPLE PRODUCTS

(71) Applicant: Microsoft Technology Licensing, LLC, Redmond, WA (US)

(72) Inventors: Tony E. Schreiner, Bellevue, WA (US); Michael J. Ens, Redmond, WA (US); Clifton J. Hebert, Bellevue, WA (US); Corey M. Bloodstein, Redmond, WA (US); Christian Fortini, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/440,478

(22) Filed: Jun. 13, 2019

(65) Prior Publication Data
US 2020/0394082 A1 Dec. 17, 2020

(51) Int. Cl.
*G06F 9/54* (2006.01)
*G06F 8/71* (2018.01)
*G06F 16/958* (2019.01)

(52) U.S. Cl.
CPC .......... *G06F 9/541* (2013.01); *G06F 8/71* (2013.01); *G06F 16/958* (2019.01)

(58) Field of Classification Search
None
See application file for complete search history.

(56) References Cited

U.S. PATENT DOCUMENTS

| | | | | |
|---|---|---|---|---|
| 7,080,356 B2 * | 7/2006 | Atallah | ............... | G06F 8/71 |
| | | | | 707/999.009 |
| 7,634,578 B2 * | 12/2009 | Pepin | ............... | H04L 69/18 |
| | | | | 709/246 |
| 8,863,108 B2 * | 10/2014 | Das | ............... | G06F 8/71 |
| | | | | 717/168 |

(Continued)

OTHER PUBLICATIONS

"ApiInformation Class", Retreived From: https://docs.microsoft.com/en-us/uwp/api/windows.foundation.metadata.apiinformation?view=winrt-19041, Retrieved Date: Sep. 19, 2019, 2 Pages.

(Continued)

*Primary Examiner* — Umut Onat
(74) *Attorney, Agent, or Firm* — Fiala & Weaver P.L.L.C.

(57) ABSTRACT

Methods, systems, and computer program products are described herein for supporting and negotiating multiple (e.g. static) application programming interface (API) versions across multiple products. Interoperable programs, such as different web browser applications, may provide simultaneous support for multiple versions of an API. An API and program-API adapters may be versioned to manage compatibility for asynchronously developed programs and APIs that may be asynchronously installed and updated in many computing environments. An adapter may comprise a versioned portion of program source code. In-development program code and APIs may be forked to create versioned snapshots of stable interfaces. An "in-development" version of an API and adapters may coexist with versioned APIs and adapters. Compatible version negotiation may occur, for example, during process launch. Negotiation may activate the highest API version supported by both programs.

20 Claims, 6 Drawing Sheets

(56) References Cited

U.S. PATENT DOCUMENTS

| | | | | |
|---|---|---|---|---|
| 8,875,160 | B2* | 10/2014 | Hunt | G06F 9/45558 |
| | | | | 719/319 |
| 9,513,978 | B2* | 12/2016 | Clissold | G06F 9/541 |
| 9,910,763 | B1* | 3/2018 | Green | G06F 11/3672 |
| 10,002,068 | B2* | 6/2018 | Green | G06F 11/3672 |
| 10,394,551 | B2* | 8/2019 | Das | G06F 8/71 |
| 10,474,479 | B1* | 11/2019 | Sequoia | G06F 9/541 |
| 10,705,850 | B2* | 7/2020 | Teixeira | G06F 9/54 |
| 2003/0126311 | A1 | 7/2003 | Kushnirskiy et al. | |
| 2007/0016691 | A1* | 1/2007 | Pepin | H04L 69/18 |
| | | | | 709/246 |
| 2010/0082689 | A1* | 4/2010 | Wargin | G06Q 40/08 |
| | | | | 707/791 |
| 2014/0237370 | A1* | 8/2014 | Canitz | G06F 3/167 |
| | | | | 715/729 |
| 2014/0344340 | A1* | 11/2014 | Tang | G06F 9/5061 |
| | | | | 709/203 |
| 2015/0154059 | A1 | 6/2015 | Teng et al. | |
| 2015/0161277 | A1 | 6/2015 | Heller et al. | |
| 2016/0182316 | A1* | 6/2016 | Katieb | H04L 67/16 |
| | | | | 709/221 |
| 2017/0115975 | A1* | 4/2017 | Rose | G06F 9/541 |
| 2018/0184229 | A1* | 6/2018 | Xie | H04W 8/005 |

OTHER PUBLICATIONS

"Direct3D", Retreived From: https://en.wikipedia.org/wiki/Direct3D, Published Date: Jun. 2, 1996, 24 Pages.

"Mojo C++ Bindings API", Retreived From: https://chromium.googlesource.com/chromium/src/+/master/mojo/public/cpp/bindings/README.md, Retrieved Date: Sep. 19, 2019, 35 Pages.

"Mojom Interface Definition Language (IDL)", Retreived From: https://chromium.googlesource.com/chromium/src/+/master/mojo/public/tools/bindings/README.md, Retrieved Date: Sep. 19, 2019, 15 Pages.

Bridge, Karl, "The Windows Runtime (WinRT) Type System", Retreived From: https://docs.microsoft.com/en-us/uwp/winrt-cref/winrt-type-system, Published Date: Jan. 25, 2019, 25 Pages.

Bridge, et al., "TargetDeviceFamily (Windows 10)", Retrieved From: https://docs.microsoft.com/en-us/uwp/schemas/appxpackage/uapmanifestschema/element-targetdevicefamily, Published Date: Apr. 5, 2017, 6 Pages.

"International Search Report and Written Opinion Issued in PCT Application No. PCT/US20/030015", dated Jul. 31, 2020, 12 Pages.

* cited by examiner

SYSTEM AND METHOD FOR SUPPORTING AND NEGOTIATING MULTIPLE API VERSIONS ACROSS MULTIPLE PRODUCTS

BACKGROUND

Some older (legacy) websites may be compatible with older web browsers (e.g. Microsoft® Internet Explorer® web browser) while newer websites may be compatible with newer web browsers (e.g. Microsoft® Edge® web browser). A single enterprise may have a combination of older and newer websites, which may necessitate switching between multiple browser applications (e.g. Internet Explorer® and Edge®).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for supporting and negotiating multiple (e.g. static) API versions across multiple products. An API and program-API adapters may be versioned to manage compatibility for asynchronously developed programs and APIs that may be asynchronously installed and updated in many computing environments. An adapter may comprise a versioned portion of program source code. In-development program code and APIs may be forked to create versioned snapshots of stable interfaces. An "in-development" version of an API and adapters may coexist with versioned APIs and adapters. Interoperable programs, such as different browser applications, may provide simultaneous support for multiple versions of an API. Compatible version negotiation may occur, for example, during process launch. Negotiation may activate the highest API version supported by both programs.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
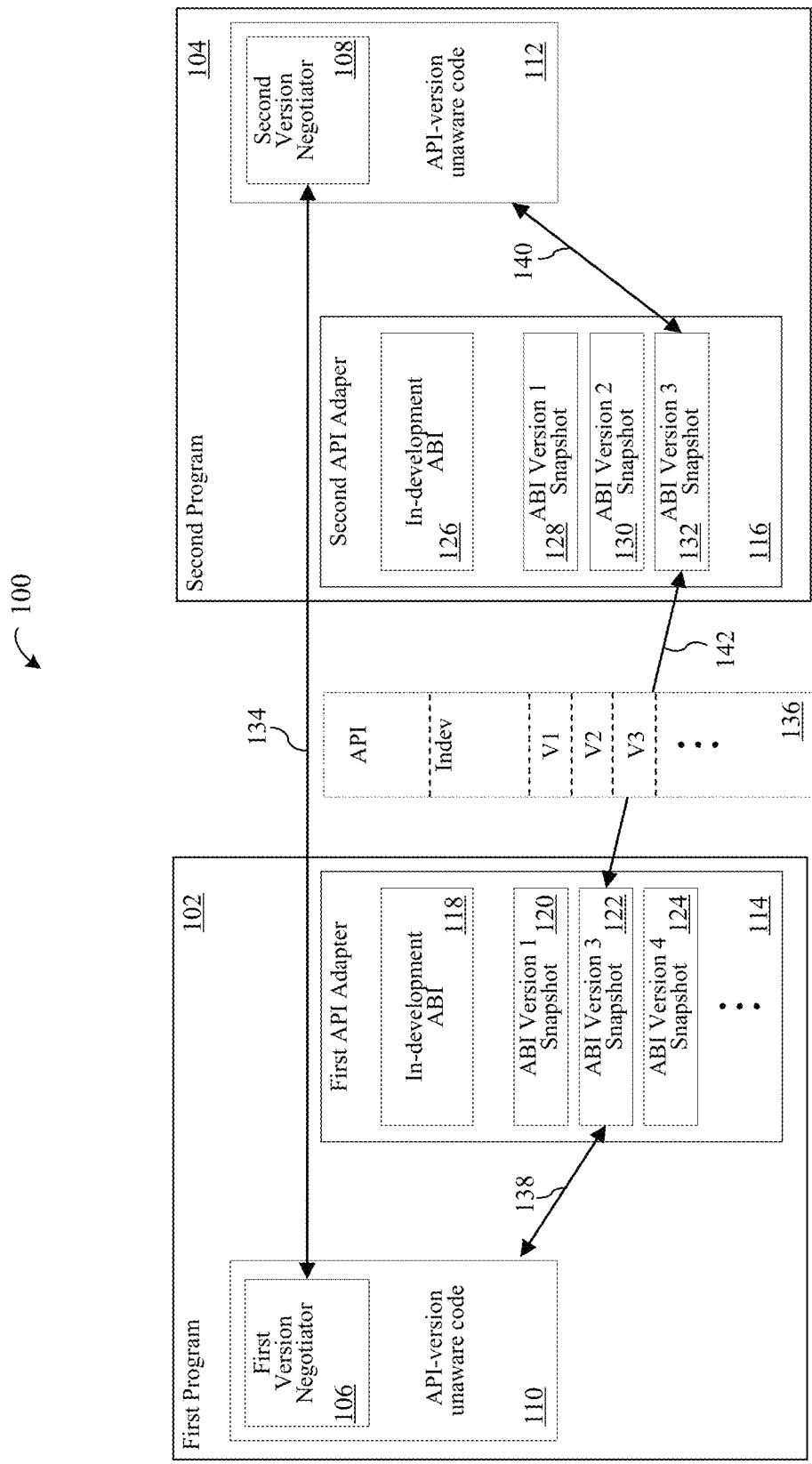
FIG. 1 is a block diagram of an example system for supporting and negotiating multiple API versions across multiple products in accordance with an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

Each embodiment is presented as an example among many possible examples of the subject matter disclosed and/or claimed herein. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Supporting and Negotiating Multiple API Versions Across Multiple Products A many-to-many version compatibility problem exists for many different computing environments with many different combinations of software (e.g. various versions and updates). Interoperable programs (e.g. operating systems and/or applications) and their interoperability interfaces (e.g. application programming interfaces (APIs)) may have asynchronous product development, updates, testing, versioning, releases, self-hosting and end-user installations and updates. For example, operating system updates may occur less often than application and API updates. Program development (e.g. from pilots to full releases) may have different update channels (e.g. daily, weekly, monthly). Self-hosting may require deciphering a variety of notifications about breaking changes in order to find the right combination of compatible builds, only to be broken again when another program is updated the following day, week, etc.

An API may comprise, for example, two components (e.g. programs) configured to communicate with each other (e.g. with a formal interface contract). An API may comprise a manner of communication (e.g. a calling pattern). An adapter may comprise, for example, an application binary interface (ABI). An ABI may be an interface between binary modules. A COM interface may comprise an ABI. An ABI may comprise, for example, an API plus lower-level implementation details about how components communicate with each other on a binary level. This may include, for example, timing, memory layout and calling conventions.

An API may be versioned for interoperable programs with asynchronous development. For example, there may be a variety of API versioning techniques (e.g. in Microsoft® Windows® operating system).

Application developers may be motivated to run on as many versions of an OS (e.g. Windows®) as possible, while taking advantage of new features in new releases and updates. This may be accomplished, for example, by probing for a new API at runtime and falling back on an older API when a feature isn't present. Some Windows® and C++ related examples may include, for example, WinRT (e.g. runtime class activation), COM (e.g. CoCreateInstance, QueryInterface, QueryService) and Win32 (e.g. LoadLibrary and GetProcAddress).

Methods, systems, and computer program products are described herein for supporting and negotiating multiple (e.g. static) API versions across multiple products. Interoperable programs, such as Microsoft® Edge® and Internet Explorer® browser applications, may provide simultaneous support for multiple versions of an API. An API and program-API adapters may be versioned to manage compatibility for asynchronously developed programs and APIs that may be asynchronously installed and updated in many computing environments. An API may be versioned for interoperable programs with asynchronous development. In an example, a portion (e.g. fraction or subset) of source code in each program may (e.g. also) be frozen (e.g. copied) to create a snapshot for each (e.g. adapter) side of an API that works for each program (e.g. Edge® and Internet Explorer®). An adapter may comprise a versioned portion of program source code. In-development program code and APIs may be forked and provided (e.g. tagged) with version numbers to create versioned snapshots of stable interfaces. An "in-development" version of an API and adapters may coexist with versioned APIs and adapters. Compatible version negotiation may occur, for example, during process launch. Negotiation may activate the highest API version supported, for example, when an Edge® tab is in Internet Explorer® mode.

A. Example System for Supporting and Negotiating Multiple API Versions Across Multiple Products FIG. 1 is a block diagram of an example system for supporting and negotiating multiple API versions across multiple products in accordance with an example embodiment. Example system 100 may comprise any computing environment. A computing environment may comprise any number and type of computing devices and any number and type of communication paths (e.g. local connection and/or one or more wired or wireless networks) between computing devices. An example computing device is presented in FIG. 6. Example system 100 may comprise first program 102, second program 104 and application programming interface (API) 136. First program 102 and second program 104 may be designed and/or adapted to interact, for example, using one or more APIs, such as API 136. First program 102, second program 104 and API 136 may be developed asynchronously.

API 136 may comprise any type of interface (e.g. component object model (COM) interface, Mojo interface and so on). Interface definitions may be provided, for example, in an interface definition language (IDL) file. In an example, API 136 may comprise an application binary interface (ABI). API 136 may be developed, for example, to support interoperability between programs (e.g. first program 102 and second program 104). For example, API 136 may be modified to adapt to changes in one or more of first program 102 and second program 104. For example, first program 102 and/or second program 104 may add new features over time. API 136 may be modified to support new features. API may be a versioned interface. In an example, API 136 may be (e.g. periodically) forked and versioned, for example, when testing determines API 136 provides a stable interface between one or more versions of first program 102 and second program 104. Forking creates a copy (e.g. a snapshot), which may be frozen as a version of the in-development version at a certain stage of development. In an example (e.g. as shown in FIG. 1), API 136 may comprise one or more versions, e.g., in-development (indev) version, version 1 (v1), v2, v3 and so on.

First program 102 may comprise any type of program (e.g. application, operating system). First program 102 may comprise, for example, API-version unaware (e.g. unversioned) code 110 and API-version aware (e.g. versioned) code, such as first API adapter 114. First API adapter 114 may, for example, insulate or buffer API-version unaware code 110 from interface-specific communications and changes thereto. First API adapter 114 and API-version unaware code 110 may communicate, for example, via in-process communications 138. In an example, API-version aware code may comprise hundreds to thousands of lines of code while unversioned code may comprise hundreds of thousands to millions of lines of code. First API adapter 114 may comprise an ABI, for example, as shown by non-limiting example in FIG. 1. While first API adapter 114 and versions thereof may be part of or developed in conjunction with first program 102, first API adapter 114 may (e.g. during interaction between first program 102 and second program 104) remain in first program 102 or may be accessed and loaded by another component, e.g., API 136 and/or second program 104.

First API adapter 114 may be versioned. In an example, first API adapter 114 may be (e.g. periodically) forked and versioned, for example, when testing determines API 136 provides a stable interface between one or more versions of first program 102 and second program 104. Forking creates a copy (e.g. a snapshot), which may be frozen as a version of the in-development version at a certain stage of development. In an example (e.g. as shown in FIG. 1), first API adapter 114 may comprise one or more versions, e.g., in-development (indev) ABI 118, ABI version 1 (v1) 120, ABI v2 (not shown), ABI v3 122, ABI v4 124 and so on.

Some versions may be unavailable (e.g. deprecated or removed), such as v2 in the example shown.

First program 102 may be developed with any number of versions and updates, which may be independent of development, versions and updates for second program 104. Any version of first program 102 may be installed and updated in a computing environment. In various examples, there may be hundreds, thousands, millions or billions of installations, many with different versions and/or updates of first program 102. Accordingly, various installations of first program 102 (e.g. with various versions of first API adapter 114) may be compatible with various (e.g. one or more) versions of API 136. An analysis (e.g. a negotiation) may be performed to determine which API version(s) are compatible with first program 102.

An API version negotiator may be stand-alone (e.g. independent of) or integrated with first program 102. In an example (e.g. of integration), API-version unaware code 110 may comprise, for example, first version negotiator 106. First version negotiator 106 may be, for example, unversioned. First version negotiator 106 may communicate with a counterpart version negotiator in second program 104 (e.g. second version negotiator 108). First version negotiator 106 may be triggered (e.g. called), for example, when first program 102 and/or second program 104 need to interact (e.g. communicate, host and so on). First version negotiator 106 may communicate with a corresponding version negotiator, for example, over a communication channel 134 (e.g. pipeline). Communication over communication channel 134 may be based on a protocol, which may be specified by an (e.g. unversioned) API.

Second program 104 may comprise any type of program (e.g. application, operating system). Second program 104 may comprise, for example, API-version unaware (e.g. unversioned) code 112 and API-version aware (e.g. versioned) code, such as second API adapter 116. Second API adapter 116 may, for example, insulate or buffer API-version unaware code 112 from interface-specific communications and changes thereto. Second API adapter 116 and API-version unaware code 112 may communicate, for example, via in-process communications 140. In an example, API-version aware code may comprise hundreds to thousands of lines of code while unversioned code may comprise hundreds of thousands to millions of lines of code. Second API adapter 116 may comprise an ABI, for example, as shown by non-limiting example in FIG. 1. While second API adapter 116 and versions thereof may be part of or developed in conjunction with second program 104, second API adapter 116 may (e.g. during interaction between first program 102 and second program 104) remain in second program 104 or may be accessed and loaded by another component, e.g., API 136 and/or first program 102.

Second API adapter 116 may be versioned. In an example, second API adapter 116 may be (e.g. periodically) forked and versioned, for example, when testing determines API 136 provides a stable interface between one or more versions of first program 102 and second program 104. Forking creates a copy (e.g. a snapshot), which may be frozen as a version of the in-development version at a certain stage of development. In an example (e.g. as shown in FIG. 1), second API adapter 116 may comprise one or more versions, e.g., in-development (indev) ABI 126, ABI version 1 (v1) 128, ABI v2 130, ABI v3 132 and so on. In the example, shown, ABI v3 132 is the highest version (e.g. other than in-development ABI 126) known by, present on or available to second API adapter 116. Some versions may be unavailable (e.g. deprecated or removed).

Second program 104 may be developed with any number of versions and updates, which may be independent of development, versions and updates for first program 102. Any version of second program 104 may be installed and updated in a computing environment. In various examples, there may be hundreds, thousands, millions or billions of installations, many with different versions and/or updates of second program 104. Accordingly, various installations of second program 104 (e.g. with various versions of second API adapter 116) may be compatible with various (e.g. one or more) versions of API 136. An analysis (e.g. a negotiation) may be performed to determine which API version(s) are compatible with second program 104.

An API version negotiator may be stand-alone (e.g. independent of) or integrated with second program 104. In an example (e.g. of integration), API-version unaware code 112 may comprise, for example, second version negotiator 108. Second version negotiator 108 may be, for example, unversioned. Second version negotiator 108 may communicate with a counterpart version negotiator in first program 102 (e.g. first version negotiator 106). Second version negotiator 108 may be triggered (e.g. called), for example, when second program 104 and/or first program 102 need to interact (e.g. communicate, host and so on). Second version negotiator 108 may communicate with a corresponding version negotiator, for example, over a communication channel 134 (e.g. pipeline). Communication over communication channel 134 may be based on a protocol, which may be specified by an (e.g. unversioned) API.

In an example, first program 102 or second program 104 may initiate and/or respond to a negotiation trigger. Version negotiation may be initiated, for example, preceding (e.g. at the start of) an interaction session. First program 102 and/or second program 104 may generate and/or receive an event notification that triggers configuration of first program 102, second program 104 and/or API 136 for interaction. For example, first program 102 may determine that it needs to interact with second program 104. Second program 104 may be instantiated (e.g. by first program 102), for example, when second program 104 is not already running Communication channel 134 may be instantiated, for example, for initial communication between first program 102 and program 104 (e.g. for version negotiation, loading, initialization and so on).

Version negotiation may be initiated by first version negotiator 106 or second version negotiator 108. For example, API-version unaware code 110 may cause first version negotiator 106 to query second version negotiator 108 about supported API versions. Negotiation logic in first version negotiator 106 and second version negotiator 108 be may configured, for example, to query/respond about supported API versions. In an example, first API adapter 114 and second API adapter 116 may specify supported versions. An initiating negotiator may query and a responding negotiator may respond, for example, regarding a list of supported versions, a specific version supported, a highest version supported, etc. Version query/response may be iterative, for example.

Version negotiation settles on (e.g. determines or selects) mutually compatible version(s) of first API adapter 114, second API adapter 116 and API 136. In an example negotiation, there may be (e.g. potentially discontinuous or limited) K possible versions of API 136, M possible versions of first API adapter 114 and N possible versions of second API adapter 116. Each computing environment comprising first program 102 and second program 104 may vary in compatible versions. In-development versions of API 136, first API adapter 114 and second API adapter 116 may or may not be selectable during version negotiation, for example, based on a program setting and/or configuration. In-development versions may (e.g. alternatively) be accessed, for example, by an (e.g. a command line) override.

In an example (e.g. as shown in FIG. 1), version 3 is the highest version of compatibility between first program 102 and second program 104 via API 136. Negotiation or other logic may activate (e.g. instantiate and initialize) selected compatible versions of API 136, first API adapter 114 and second API adapter 116. Interaction (e.g. communication) may occur between first program 102 and second program 104 using the activated versions of API 136, first API adapter 114 and second API adapter 116. In an example (e.g. as shown in FIG. 1), communications between first program 102 and second program 104 may occur over communication pipeline 142 using version 3 of API 136, first API adapter 114 and second API adapter 116.

FIG. 1 presents one of many possible examples of supporting and negotiating multiple (e.g. static) API versions across multiple products. Other implementations may vary. A more specific example, e.g., one of many possible implementations, is presented with reference to a web browsing example shown in FIG. 2.

An example of a many-to-many version compatibility problem and example solutions are presented with respect to web browsing. Websites may be compatible with different web browsers. Some older (legacy) websites may be compatible with older web browsers (e.g. Microsoft® Internet Explorer® web browser) while newer websites may be compatible with newer web browsers (e.g. Microsoft® Edge® web browser). A single enterprise may have a combination of older and newer websites, which may necessitate a two-browser solution (e.g. Internet Explorer® and Edge®). Internet Explorer® is integrated with the Windows® operating system. The latest version of Internet Explorer® is version 11, which may be available, for example, in Windows® operating system versions 7, 8, 10 and 12. An information technology (IT) administrator may manage website and browser compatibility issues, for example, by creating a list of legacy websites that require Internet Explorer®. Such lists may be used to decide which browser to open as users navigate between websites. This solution alternates between two different programs during a singular function of web "surfing." As a result, the look and feel of each program is different. Users have different settings and favorites on each program, etc.

Edge® may be improved, for example, to render current and legacy websites. In an example, a first program (e.g. Edge®) may host (e.g. as needed) a second program (e.g. Internet Explorer®) to render current and legacy pages seamlessly (e.g. transparent to a user with the same look and feel). For example, Edge® may have an Internet Explorer® mode, where Edge® (a rendering engine itself) hosts Internet Explorer® (e.g. as a nested rendering engine) to render legacy webpages. This may be referred to, for example, as a dual engine browser.

A dual engine browser may improve end-user experience while surfing current and legacy websites. For example, legacy and other webpages may be presented in a common browser with common appearance, user settings, favorites and modern features. Browser engine transitioning between may appear seamless to users.

Edge® and Internet Explorer® interoperability in a dual engine browser may be implemented, for example, by Edge® and Internet Explorer® interacting through one or more APIs (e.g. COMN 218). In an example, Internet Explorer® may be modified to expose an API between Edge® and Internet Explorer®. Edge® may host Internet Explorer®, for example, by adding a set of APIs on top of the Internet Explorer® browser (e.g., represented by CBrowserFrame). A dual engine browser may involve communication between Edge® and Internet Explorer® processes, for example, through a set of APIs (e.g. statically typed APIs, such as C++).

Interoperability of asynchronously developed Edge®, Internet Explorer® and one or more APIs may lead to a many-to-many version compatibility problem for many different installations of Edge® and Internet Explorer® in many different computing environments. For example, Internet Explorer®, implemented as part of the Windows® operating system, may be released and updated at the cadence of Windows® operating system releases and updates, with a long lead time. Edge® may support multiple versions of the Windows® operating system, e.g., beginning with Windows® 7, each with their own servicing pipelines. Edge® may have multiple update channels, each shipping at their own cadence (e.g. daily, weekly, monthly). Customers (e.g. enterprise, individuals) may choose to hold off on updates to Edge® and/or Windows®. Dual-browser engine development may yield rapid (e.g. several daily) iterations in APIs and coordinated changes to Edge® and Internet Explorer®.

X versions and updates of Edge® and Y versions and updates of Internet Explorer®, variously installed in many computing environments, may be supported, for example, by versioning an API (e.g. COM) and adapters on each side of the API boundary. Source code for adapters may be (e.g. automatically or semi-automatically) forked along with the API definition from in-development versions of Edge®, Internet Explorer® and the API to create stable versions of a dual engine browser. An "in-development" version of the APIs may coexist with versioned APIs. Internet Explorer® and Edge® may provide simultaneous support for multiple versions of the API.

Figure 2:
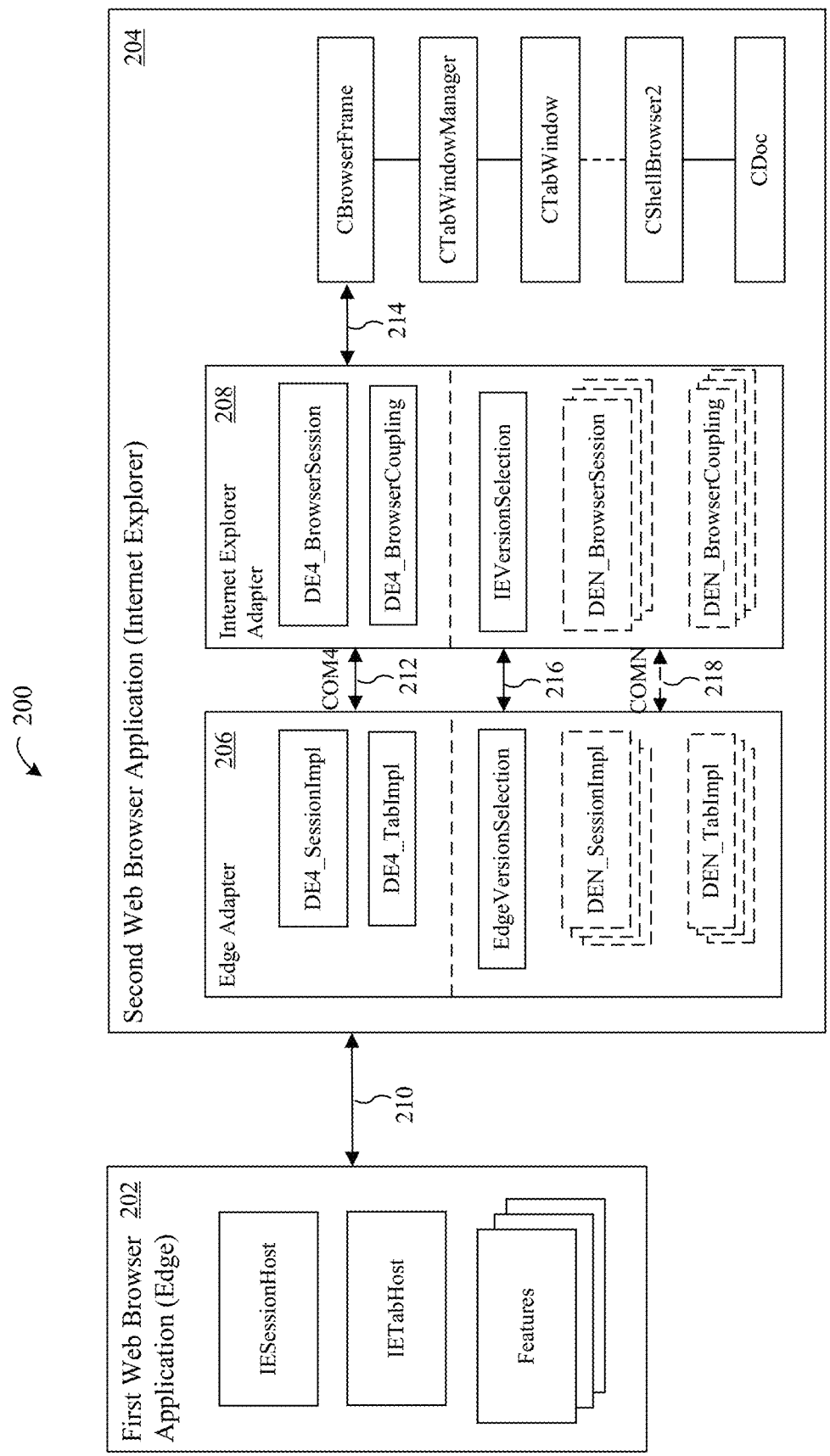
FIG. 2 is a block diagram of an example browser system for supporting and negotiating multiple API versions across multiple browser products in accordance with an example embodiment.

FIG. 2 is a block diagram of an example browser system for supporting and negotiating multiple API versions across multiple browser products in accordance with an example embodiment. Example system 200 may comprise any computing environment. A computing environment may comprise any number and type of computing devices and any number and type of communication paths (e.g. local connection and/or one or more wired or wireless networks) between computing devices. An example computing device is presented in FIG. 6.

Example system 200 may comprise, for example, a dual browser engine. Example system 200 may comprise, for example, a first web browser application 202 (e.g. Edge®) and a second web browser application 204 (e.g. Internet Explorer®). In an example, first web browser application 202 and second web browser application 204 may interact, for example, using one or more versioned APIs, such as a versioned COM interface (e.g. COMN 218, where N may indicate version numbers of a COM interface).

First web browser application 202 may comprise, for example, Edge adapter 206 and other logic, e.g., IESessionHost, IETabHost and Edge Features. Other portions of first web browser application 202 may not be shown for clarity. First web browser application 202 may comprise versioned and unversioned logic. An API version-aware (versioned) portion of logic (e.g. code) for first web browser application 202 may comprise, for example, Edge adapter 206. Unversioned logic of first web browser application 202 may comprise, for example, IESessionHost, IETabHost and Features. Versioned and unversioned portions of first web browser application 202 may communicate over interface 210, which may comprise a Mojo interface. First web browser application 202 may comprise an executable file (e.g. msedge.exe).

IESessionHost may comprise Edge code (e.g. on the Edge side of a Mojo boundary) that represents a session. IESessionHost may communicate with other Edge code. A session may be based on a user profile. In an example, there may be one user profile. In an example, there may be multiple user profiles (e.g. home, work profiles), which may lead to multiple sessions with one or more tabs for each session (e.g. in a single Edge window). In an (e.g. another) example, InPrivate/Incognito browsing may create a separate session. In an example (e.g. of Internet Explorer mode), a (e.g. each) session may map to a separate instance of Internet Explorer®.

IETabHost may comprise Edge code that represents an Internet Explorer tab, for example, when first web browser application 202 is in Internet Explorer mode.

Edge Features may comprise Edge code that may interact with Internet Explorer mode tabs, for example, through IESessionHost, IETabHost and corresponding callbacks.

Edge adapter 206 may comprise versioned adapters. Edge adapter 206 may, for example, provide a bridge between a first interface (e.g. Mojo) and a second interface (e.g. COM interface such as COMN 218). Mojo interface 210 may be implemented between first web browser application 202 and Edge adapter 206. In an example, Mojo may be unversioned while COM may be versioned. Edge adapter 206 may be implemented, for example, as a dynamic link library (DLL) file (e.g. dual_engine_adapter.dll). Edge adapter 206 may be loaded into second web browser application 204, for example, when second web browser application 204 is instantiated. Edge adapter 206 may comprise one or more adapters or adapter components (e.g. DESessionImpl and DETabImpl). Edge adapter 206 components (e.g. DESessionImpl and DETabImpl) may communicate with Internet Explorer adapter 208 components (e.g. CDEBrowserSession and CDEBrowserCoupling).

In an example, Edge adapter 206 may "consume" Internet Explorer adapter 208. Edge adapter 206 may use a similar strategy (e.g. observers and delegates) to consume the API (e.g. COMN 218) and implement callbacks. In an example, this may lead to a separate DETabImpl implementation for each version.

Second web browser application 204 may comprise, for example, Internet Explorer adapter 208 and other logic, e.g., CBrowserFrame. Other portions of second web browser 204 may not be shown for clarity. Second web browser application 204 may comprise versioned and unversioned logic. An API version-aware (versioned) portion of logic (e.g. code) for second web browser application 204 may comprise, for example, Internet Explorer adapter 208. Unversioned Internet Explorer logic may comprise, for example, CbrowserFrame and other objects. Versioned and unversioned portions of second web browser application 204 may communicate over interface 214, which may comprise a C++ interface. Second web browser application 204 may comprise an executable file (e.g. iexplore.exe).

CBrowserFrame may logically represent a top-level Internet Explorer window, which may logically map to an Edge tab, e.g., in Edge Internet Explorer mode. CTabWindowManager may comprise all tabs for a given Internet Explorer window. In an example of Edge Internet Explorer mode, there may be one tab. CTabWindow may comprise an object in a "manager process" that represents a tab. CShell-Browser2 may comprise the top object in a "content process" that represents a tab. CDoc may comprise the top object in an Internet Explorer browser engine (e.g. mshtml.dll).

Internet Explorer adapter 208 may comprise multiple adapter objects (e.g. DEBrowserSession and DEBrowserCoupling). Adapter objects may support an Internet Explorer session and tab in Edge Internet Explorer mode. Internet Explorer adapter 208 may interact with Edge adapter 206, for example, via a COM interface, which may be versioned (e.g. COMN 218). Internet Explorer adapter 208 may be called by Edge adapter 206 (e.g. dual_engine_adapter.dll). Internet Explorer adapter 208 may invoke callbacks. A browser session may comprise a (e.g. only one) "active" version of Internet Explorer adapter 208.

In an example, an API (e.g. in terms of interface definitions) may be forked along with corresponding adapter program code on each side of the API. This may render version-specific varying degrees of implementation behavior. Adapter code may help insulate remaining (e.g. the vast bulk of) program code from logical version-specific behavior differences.

A versioned API and adapters may, for example, support logical breaking changes to an API. In an example, IDEBrowser::Navigate may be modified to take additional or different parameters that may impact behavior of callbacks, such as, IDEBrowserObserver::OnNavigationComplete
    IDEBrowserObserver::OnDocumentComplete
    IDEBrowserObserver::OnNavigationFailed An API and adapters may be forked as a unit, which may preserve previous behavior while new behavior may become operable for example, when both components (e.g. programs) support a new API version. Some version-specific behavior may go beyond adapter code to other code in a program, but this approach may limit the impact and minimize the risk of regressing older API versions when new functionality is released.

Edge adapter 206 and Internet Explorer adapter 208 may be versioned, for example, coinciding with a versioned API. Support may be simultaneously provided for multiple versions of multiple programs and APIs. Edge and Internet Explorer adapter components (e.g. along with COM API) may be forked and frozen in versioned snapshots, which may provide 1:1 cardinality. Forking may be accomplished, for example, by copying in-development APIs to the next available version number. An in-development version may be, for example, unnumbered, version 1, etc. Version numbering may increase in chronological order of freezing and forking an in-development version. Versions may be added and removed over time, e.g., to create a window of compatible versions. APIs may be negotiated (e.g. by compatible version negotiation) at runtime.

Version numbers associated with forked APIs and adapters may, for example, monotonically increase, which may permit tagging corresponding interfaces with the same number. There may be gaps in version numbers supported by first web browser application 202 and/or by second web browser application 204, for example, depending on installed versions and updates for first web browser application 202 and second web browser application 204. In-development and released versions may coexist. First web browser application 202 may be configured to override released versions, for example, to use in-development versions (e.g. for development and testing). Developers who opt-in to use in-development APIs may match binaries for first web browser application 202 and second web browser application 204 for compatibility. This approach may allow first web browser application 202 and second web browser application 204 to be independently modified on different release schedules across different operating systems with negotiation for a compatible API at runtime. This approach may accommodate self-hosting dual engine functionality while iterating on an in-development version of an API. Developers may implement an API without being burdened with past implementations or predicting future implementations. For example, developers may develop an API without creating new IFoo3, IFoo4 versions of COM interfaces or worrying about breaking changes caused by adding or changing methods and their parameters.

In an example implementation, there may be multiple APIs (e.g. a COM API and a Mojo API). An implementation may version one or more APIs. In an example, a COM interface may be a versioned API (e.g. COMN 218). COM interface definitions may be provided, for example, in a file (e.g. DE.idl). COM interface definitions may comprise, for example, an unversioned in-development API and various versioned API forks of the unversioned in-development API. COM may be based on C++ virtual function tables. COM may, for example, use an sdcall calling convention. An application using these conventions may, for example, be written in Visual Basic, C#, Python, etc. and may use COM objects written in C++ without access to source code, for example, because a well specified ABI (regardless of implementation language) may be language neutral.

A Mojo interface may comprise an unversioned API (e.g. Mojo interface 210). Mojo definitions may be unversioned. Mojo interface definitions may be provided, for example, in a file (e.g. dual_engine.mojom). In one of many other example implementations, Mojo may be versioned while COM may be unversioned.

Edge adapter 206 and Internet Explorer adapter 208 may comprise COM interfaces (e.g. COMN 218). An (e.g. each) adapter may comprise one or more adapters (e.g. files, components or objects). Edge adapter 206 may comprise, for example, DEN_TabImpl and DEN_SessionImpl objects, where N represents versions of Edge adapter 206. Internet Explorer adapter 208 may comprise, for example, DEN_BrowserCoupling and DEN_BrowserSession, where N represents versions of Internet Explorer adapter 208.

Adapters (e.g. versioned portions of program code) may encompass callbacks. Versioned code may include, for example, Edge adapter 206, Internet Explorer adapter 208 and callbacks (e.g. IDEN_BrowserObserver, IDEN_BrowserSessionObserver).

APIs and/or adapters may have any structure (e.g. flat, hierarchical). In an example, APIs and/or adapters may be hierarchical, e.g.,
IDEBrowserSession
  IDEBrowser
    IDEBrowserNavigator
    IDEFindOnPage
    IDEViews
    IDESecurity
      IDEPolicyManager In an example procedure during operation, a web browser (e.g. first web browser application 202) may access a website compatible with second web browser application 204 but not first web browser application 202. First web browser application 202 may initiate an Internet Explorer mode (e.g. switch an Edge user interface tab to Internet Explorer mode). In an example (e.g. for in-development APIs), an initial IDE_BrowserSession may be retrieved as part of an initial handshake with Mojo. It may be returned as an IUnknown, which the caller may query for the expected version of the interface. IDE_BrowserSession may implement a procedure to create IDE_Browser-based objects. These objects may represent a frame that is hosted as a tab. Sub-objects may be versioned consistently with their parent objects.

In an example, an interprocess version selection (e.g. EdgeVersionSelection and IEVersionSelection) may perform version negotiation, e.g., over communication path 216) between Edge adapter 206 and Internet Explorer adapter 208 to determine which version of an API (e.g. versioned COM interface COMN) to use for Internet Explorer mode. A version negotiation may occur, for example, when an Internet Explorer process (e.g. second web browser application 204) is launched (e.g. by first web browser application 202). Negotiation may, for example, begin at the latest version of an API known to first web browser application 202. Negotiation may (e.g. when a version is not supported by second web browser application 204) roll back to earlier versions until a compatible version is found. In an example, version negotiation may begin at a highest level known to first web browser application 202 and decrement down to version 2, excluding in-development version (e.g. unnumbered or version 1). Developers, self-host users, testers, etc. may be provided with one or more procedures to use one or more program configurations (e.g. selection and/or version negotiation override) to access an in-development version.

EdgeVersionSelection may be aware of available versions of Edge adapter components (e.g. DEN_SessionImpl and DEN_TabImpl). IEVersionSelection may, for example, be aware of or may search Internet Explorer adapter 208 components DEN_BrowserSession and DEN_BrowserCoupling to determine available versions (e.g. the highest version). EdgeVersionSelection may initiate negotiation (e.g. with a query) and IEVersionNegotiation may respond. Negotiation may settle on the highest API version available in Edge adapter 206 and Internet Explorer adapter 208. In an example (e.g. as shown in FIG. 2), version 4 may be the highest compatible version mutually recognized by first web browser application 202 and second web browser application 204.

The compatible version determined during negotiation may be activated. For example, objects in compatible versions may be instantiated and initialized. In an example, EdgeVersionSelection may, for example, activate (e.g. instantiate) IDE4_SessionImpl and IDE4_TabImpl and IEVersionSelection may activate IDE4_BrowserSession and IDE4_BrowserCoupling. First web browser application 202 and second web browser application 204 may communicate through the activated versions of Edge adapter 206 and Internet Explorer adapter 208 using the activated compatible version of the COM interface COM4 212. Instantiated versioned adapters may engage in a versioning handshake, e.g., to begin normal operation.

API and adapter version selection (e.g. negotiation and instantiation) may be implemented, for example, by an unversioned initial session callback interface, which may comprise one or more APIs and macros. In an example, version negotiation may occur outside adapters (e.g. via a non-COM API). Version negotiation may occur first, for example, when second web browser application 204 loads Edge adapter 206 (e.g. dual_engine_adapter.dll). Version negotiation may occur, for example, starting with the highest version it supports and, if not supported, work down to older versions. The interface being sought and returned may not be known at compile time. A requested browser session returned during negotiation may be, for example, IDEN_BrowserSession. A query may seek an expected version (e.g. 4). In an example, IDE4BrowserSession may be implemented by CDE4BrowserSession. Adapter objects (e.g. on each side of the COM API) may be instantiated on-demand after negotiation. For example, CDE4BrowserCoupling may be created in response to calls to IDEBrowserSession::CreateDEBrowser. An (e.g. each) IDEBrowser may represent an IE mode tab in Edge. A call may occur for each new IE mode tab.

In an example, initialization and version selection may be performed by first web browser application 202. For example, negotiation may occur over an API as follows:

```
_interface DualEngineSessionClient
{
   STDMETHODIMP GetSpecifiedVersion(_out UINT* version) const=0;
   STDMETHODIMP GetVersionedBrowserSession(_in UINT version, _out IUnknown** ppSession)=0;
}
```

DualEngineSessionImpl::EnsureSession may, for example, call DualEngineSessionClient::GetVersionedBrowserSession (e.g., on the Internet Explorer side). GetVersionedBrowserSession may return an error (e.g., ERROR_NOT_SUPPORTED), for example, when a specified version isn't supported by second web browser application 204. The caller may retry with other versions. Support may be provided (e.g. as needed), for example, by IsSupportedByDEInterfaceVersion, GetDEInterfaceVersion and/or INVOKE_VERSIONED_COUPLING_CALLBACK.

Example implementations may occur on one or more local or distributed computing devices. In an example, a first computing device may execute a process corresponding to first web browser application 202 while a second computing device may execute a process corresponding to second web browser application 204.

In an example, a negotiation procedure may be remotely selected. An API (e.g. ABI) and/or one or more adapters may be remotely selected, accessed and/or downloaded (e.g. to one or more computing devices). APIs and/or Adapter code (e.g. for either program) may be in same or different modules as other (e.g. unversioned) program code and/or other versions of adapter code.

A version negotiation protocol may, for example, ping a (e.g. private or public) server before negotiating to determine whether there are changes to negotiation logic, availability of API and/or adapter versions and/or updates, which may, for example, change negotiation logic, exclude versions, change requirements, download updates, etc.

A registry key may be set, for example, to indicate whether an installed version of second web browser application 204 is configured for integration with first web browser application 202. Features may become available in first web browser application 202 and second web browser application 204/Windows® operating system different rates. Compatible, supported functionality may become operable while unsupported features may be hidden. Feature queries may query whether features are supported. In an example, a query may ask whether feature such as a menu item (e.g. printing) is supported. Features may be displayed or hidden, for example, based on such capability queries.

Figure 3:
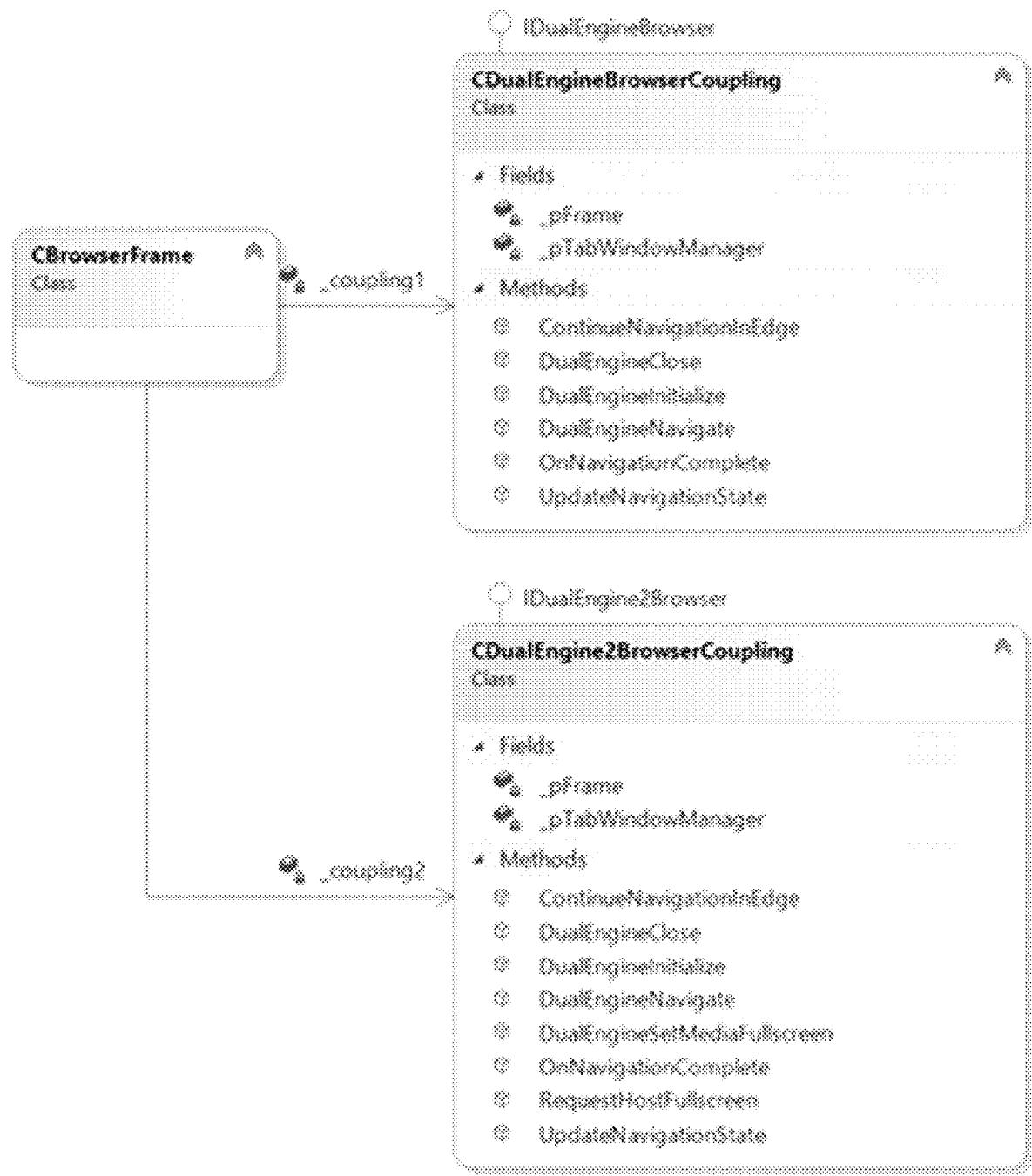
FIG. 3 is block diagram of an example interface between versioned adapter code and unversioned code.

FIG. 3 is block diagram of an example interface between versioned adapter code and unversioned code. FIG. 3 shows an example interface 300 between versioned Internet Explorer adapter 208 and unversioned logic in second web browser application 204 (e.g. CBrowserFrame). Generally, FIG. 3 shows an example of a class diagram. In greater detail, FIG. 3 shows an example of an adapter or adapter component (DEN_BrowserCoupling) in Internet Explorer adapter 208 with two different versions (e.g. CDEBrowserCoupling and CDE2BrowserCoupling) coupled to (e.g. configured to communicate with) unversioned code (e.g. CBrowserFrame) using two different (e.g. version-specific) couplings (e.g. _coupling1 and _coupling2). Portions of Internet Explorer adapter 208 (e.g. DEN_Browser) may be referred to as adapters, components, objects, etc.

Versioned Internet Explorer adapter 208 may provide an insulation layer between an exposed API (e.g. versioned COM interface COMN 218) and other (e.g. unversioned) program code, such as CBrowserFrame, etc. Versioned Internet Explorer adapter 208 may comprise one or more versioned adapters or adapter components (e.g. CDEBrowserSession and CDEBrowserCoupling), which may comprise satellite COM objects (e.g. to insulate unversioned code from a versioned COM API). Internet Explorer adapter 208 objects may reduce the need to modify (e.g. and, therefore, leave unversioned) complex classes, such as Cbrowser-Frame, to support IDEN_Browser, etc.

DEN_BrowserCoupling, which may be referred to as a satellite adapter, may include logic (e.g. satellite objects) to compensate for differences between different versions of an API (e.g. COMN 218) and adapters (e.g. Edge adapter 206, Internet Explorer adapter 208). Satellite adapters may buffer/insulate a browser engine implementation from the projected API (e.g. COM interface COMN 218), which may prevent changes in new versions of the API from leaking into older versions.

Different interface versions may be implemented in different objects. Internet Explorer adapter 208 may comprise, for example, different versions of CDN_BrowserCoupling (e.g. CDEBrowserCoupling and CDE2BrowserCoupling) that may be used to implement different versions of API COMN 218 without having to rename methods.

An (e.g. each) version of Internet Explorer adapter 208 (e.g. and adapter components) may have its own version of a COM interface and separate implementation files. A coupling holder may hold couplings for supported versions. A holder and couplings may have the same lifetime as CBrowserFrame.

Different versions of coupling holder may support creation and management of different versions of browser coupling objects (e.g. CDEBrowserCoupling and CDE2BrowserCoupling). A coupling holder may be a conduit for callbacks from other browser code. Coupling macros may minimize or eliminate version-aware code outside adapters.

A CBrowserFrame object may implement multiple couplings in a coupling holder, e.g., _coupling1, _coupling2 and so on. In an example, there may be N couplings, one for each of N versions of IDEN_BrowserCoupling in Internet Explorer adapter 208. Browser couplings may be implemented in a hierarchy under a coupling holder. For example,

```
CBrowserFrame
   DEBrowserCouplingHolder
      _coupling1
      _coupling2
      . . .
```

In an example, there may be a 1:1 mapping between interfaces (e.g. IDE4Browser) and implementations in CDE4BrowserCoupling. Forked implementations may support backwards compatibility across a variety of scenarios while permitting rapid iterations.

Different versions of Internet Explorer adapter 208 objects (e.g. CDEBrowserCoupling and CDE2BrowserCoupling) may implement the same and different (e.g. additional) methods (e.g. to implement different versions of an API such as COM interface).

A contract between IDEN_Browser and CBrowserFrame (e.g. via communication pipeline 214) may be non-versioned C++, which may simplify changing method signatures to add optional parameters, etc. while maintaining compatibility.

Figure 4:
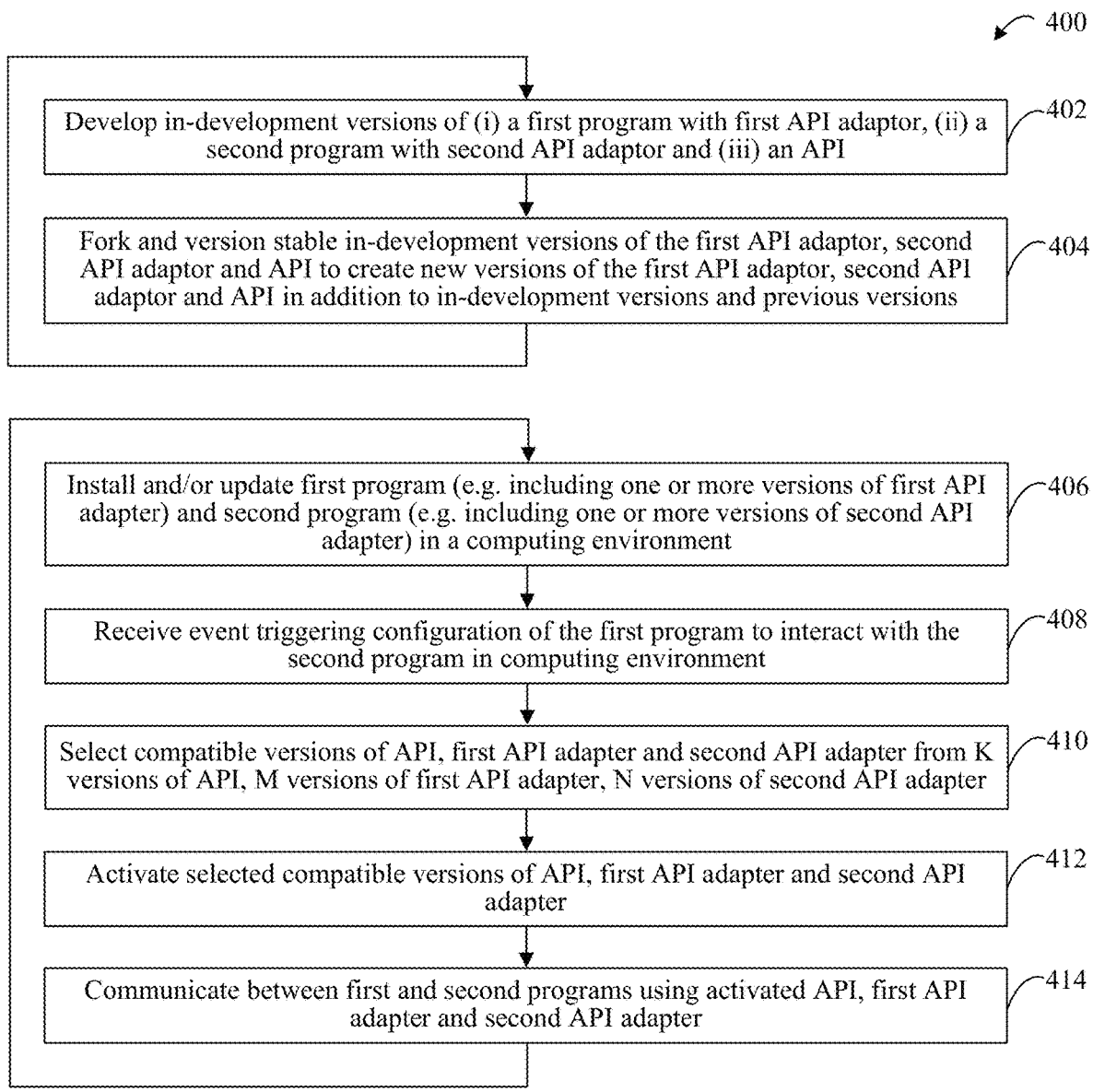
FIG. 4 is a flowchart of an example method for supporting and negotiating multiple API versions across multiple products in accordance with an example embodiment.

B. Example Methods for Supporting and Negotiating Multiple API Versions Across Multiple Products Embodiments may also be implemented in processes or methods. For example, FIG. 4 is a flowchart of an example method for supporting and negotiating multiple API versions across multiple products in accordance with an example embodiment. Embodiments disclosed herein and other embodiments may operate in accordance with method 400. Method 400 comprises steps 402 to 414. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 4. FIG. 4 is simply one of many possible embodiments. Embodiments may implement fewer, more or different steps.

Method 400 begins with step 402. In step 402, in-development versions of (i) a first program (e.g. with first API adaptor), (ii) a second program (e.g. with second API adaptor) and (iii) an API may be (e.g. asynchronously) developed. For example, as shown in FIG. 1, first program 102 (with first API adapter 114), second program 104 (with second API adapter 116) and API 136 may be (e.g. asynchronously) developed.

At step 404, stable in-development versions of the first API adaptor, second API adaptor and API may be forked and versioned to create new versions of the first API adaptor, second API adaptor and API in addition to in-development versions and previous versions. For example, as shown in FIG. 1, in-development versions of first API adapter 114, second API adapter 116 and API 136 may be forked and versioned to create version 3 to add to existing/previous versions 1 and 2.

At step 406, a first program (e.g. including one or more versions of the first API adapter) and a second program (e.g. including one or more versions of the second API adapter) may be installed and/or updated in a computing environment. For example, as shown in FIG. 1, first program 102 and second program 104 may be installed and/or updated (e.g. at the same or different times or rates) in a computing environment represented by example system 100.

At step 408, an event may be received that triggers configuration of the first program to interact with the second program in a computing environment. For example, as shown in FIG. 1, first program 102 (e.g. API-version unaware code 110) may receive an event triggering first version negotiator 106 to initiate API version negotiation with second version negotiator 108. With reference to the example in FIG. 2, receiving an event may comprise, for example, first web browser application 202 (e.g., Edge®) navigating to a webpage determined to be incompatible therewith.

At step 410, compatible versions of the API, first API adapter and second API adapter are selected from K versions of the API, M versions of the first API adapter, and N versions of second API adapter, respectively. For example, as shown in FIG. 1, first version negotiator 106 may negotiate with second version negotiator 108 to select a compatible version of API 136, first API adapter 114 and second API adapter 116. As shown in FIG. 1, the selected compatible version is version 3.

At step 412, the selected compatible versions of the API, first API adapter and second API adapter may be activated. For example, as shown in FIG. 1, selected API v3, ABI version 3 snapshot 122 and ABI version 3 snapshot 132 may be activated.

At step 414, the first and second programs may interact (e.g. communicate) using the activated API, first API adapter and second API adapter. For example, as shown in FIG. 1, first program 102 (e.g. API-version unaware code 110) may interact with second program 104 (e.g. API-version unaware code 112) via active API v3, ABI version 3 snapshot 122 and ABI version 3 snapshot 132.

Figure 5:
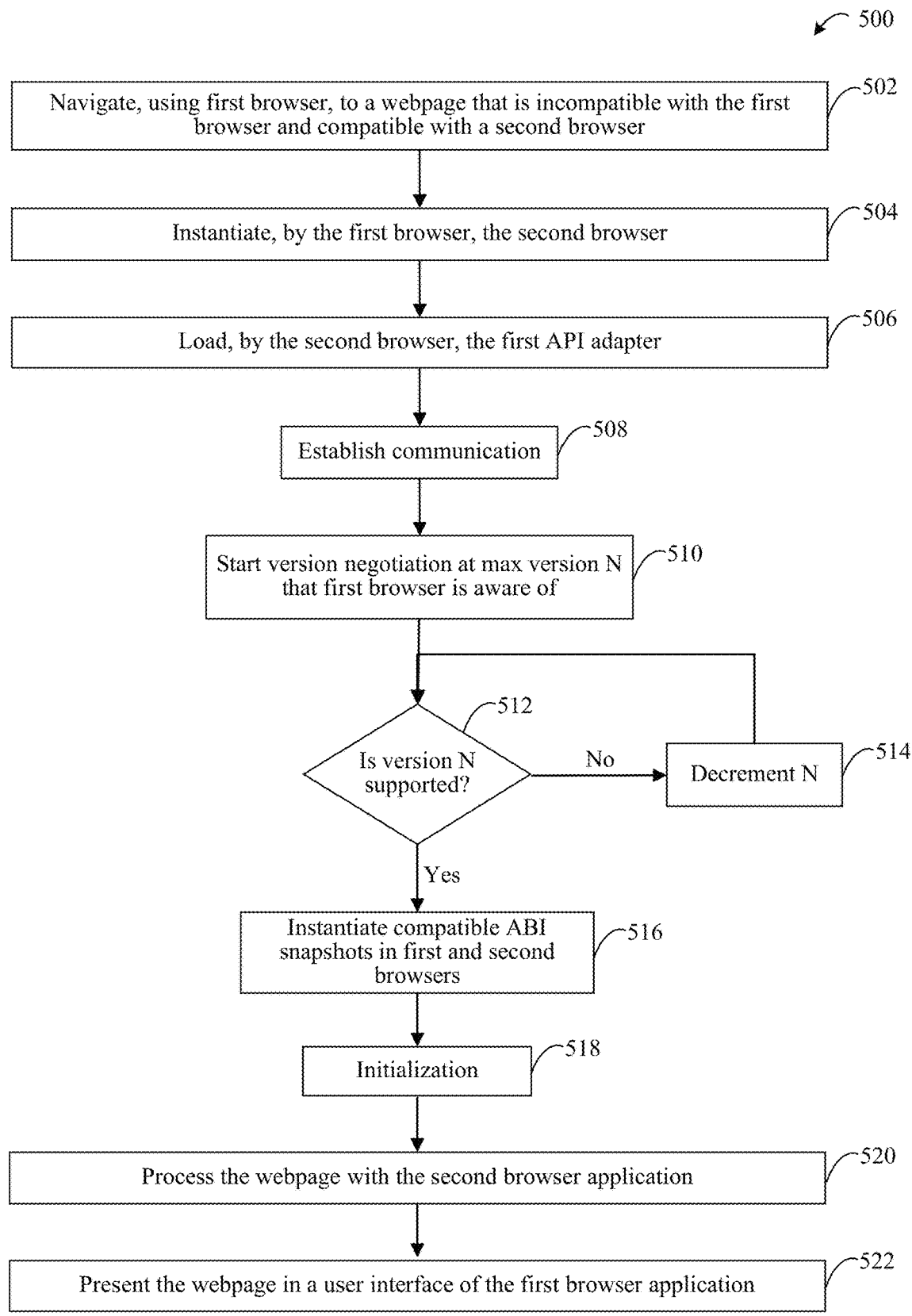
FIG. 5 is a flowchart of an example method for supporting and negotiating multiple API versions across multiple browser products in accordance with an example embodiment.

FIG. 5 is a flowchart of an example method for supporting and negotiating multiple API versions across multiple browser products in accordance with an example embodiment. Embodiments disclosed herein and other embodiments may operate in accordance with method 500. Method 500 comprises steps 502 to 522. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps.

Method 500 begins with step 502. In step 502, a first browser may navigate to a webpage that is incompatible with the first browser and compatible with a second browser. For example, with reference to FIG. 2, first web browser application 202 (e.g., Edge®) may navigate to a webpage that is incompatible with first web browser application 202 and compatible with second web browser application 204 (e.g., Internet Explorer®).

At step 504, the first browser may instantiate the second browser. For example, with reference to FIG. 2, first web browser application 202 (e.g., Edge®) may instantiate second web browser application 204 (e.g., Internet Explorer®).

At step 506, the second browser may load the first API adapter. For example, as shown in FIG. 2, second web browser application 204 (e.g., Internet Explorer®) may load Edge adapter 206.

At step 508, communication may be established. For example, as shown in FIG. 2, EdgeVersionSelection may communicate with IEVersionSelection over communication path 216.

At step 510, version negotiation may begin at a max (greatest) version N that the first browser is aware of. For example, with reference to FIG. 2, EdgeVersionSelection may query IEVersionSelection whether it is compatible with the highest version N that first web browser application 202 is aware of.

At step 512, the second browser may determine whether it supports version N. For example, as shown in FIG. 2, IEVersionSelection may respond to a query indicating whether it supports version N. Incompatibility with version N may lead to step 514 while compatibility may lead to step 516.

At step 514, N may be decremented. For example, with reference to FIG. 2, EdgeVersionSelection may respond to an indication by IEVersionSelection that it is incompatible with version N.

At step 516, compatible ABI snapshots are instantiated in the first and second browsers. For example, with reference to FIG. 2, EdgeVersionSelection and IEVersionSelection may respond to an indication by IEVersionSelection that it is compatible with version N (e.g. version 4), by instantiating version 4 of Edge adapter 206 and version 4 of Internet Explorer adapter 208.

At step 518, initialization of instantiated adapters may occur. For example, with reference to FIG. 2, EdgeVersionSelection may initialize Edge adapter 206 objects DE4_SessionImpl and DE4_TabImpl and IEVersionSelection may initialize Internet Explorer adapter 208 objects DE4_BrowserSession and DE4_BrowserCoupling for communication over COM4 API.

At step 520, the webpage may be processed with the second browser application. For example, with reference to FIG. 2, second web browser application 204 (e.g., Internet Explorer®) may process the Internet-Explorer-compatible webpage.

At step 522, the webpage may be presented in a user interface of the first browser application. For example, with reference to FIG. 2, the webpage processed by second web browser application 204 (e.g., Internet Explorer®) may be presented in a browser interface tab of first web browser application 204 (e.g., Edge®).

III. Example Computing Device Embodiment

Systems described herein, may be implemented together in an SoC. In an example, an SoC may include an integrated circuit chip comprising one or more of a processor (e.g. central processing unit (CPU), microcontroller, microprocessor, digital signal processor (DSP)), memory, one or more communication interfaces, and/or further circuits, and may (e.g. optionally) execute received program code and/or include embedded firmware to perform functions.

Figure 6:
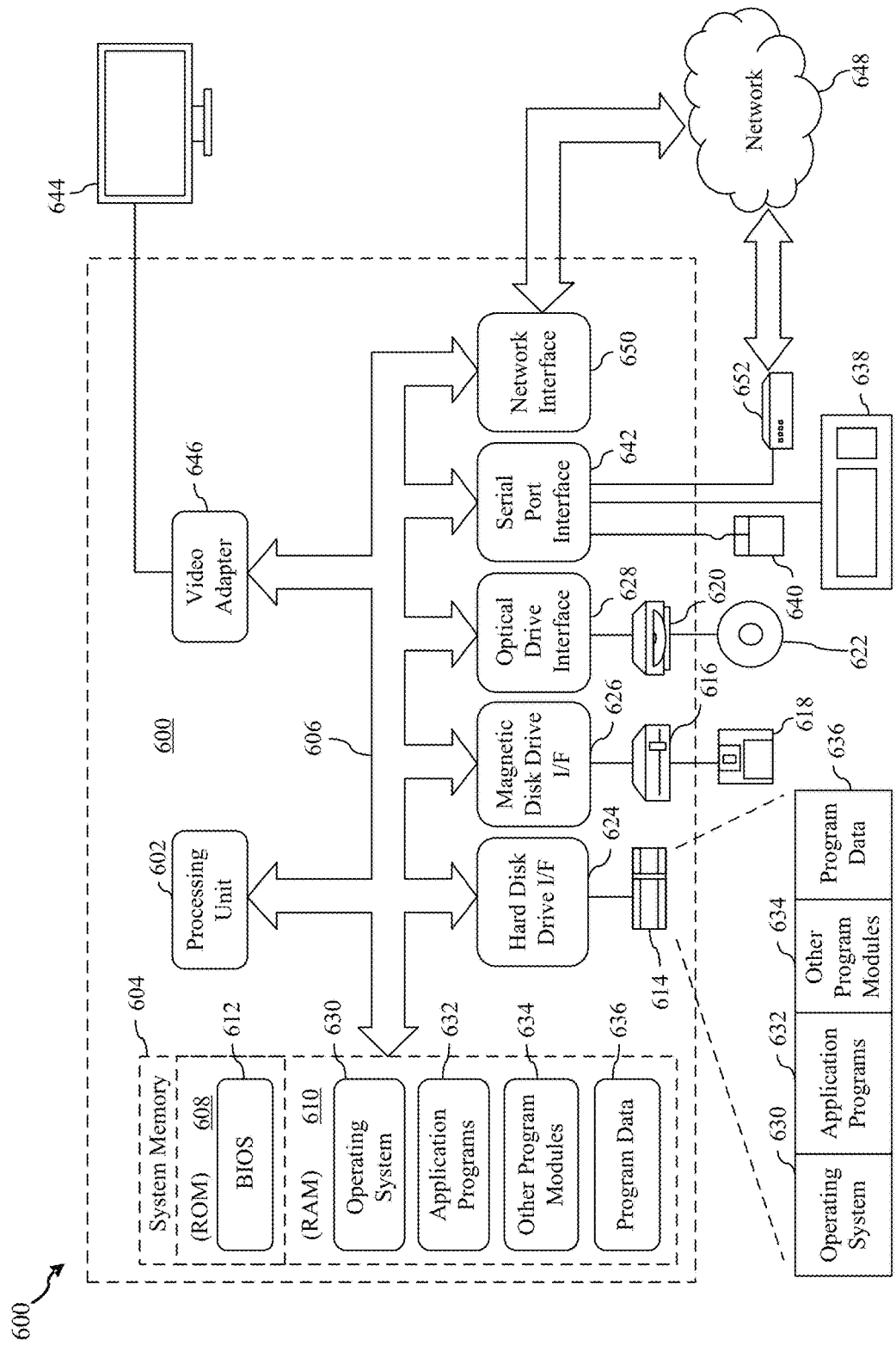
FIG. 6 is a block diagram of an example computing device that may be used to implement embodiments.

FIG. 6 is a block diagram of an example computing device that may be used to implement embodiments. FIG. 6 depicts one of many examples of a computing device in which embodiments may be implemented. The description of computing device 600 provided herein is provided for purposes of illustration, and is not intended to be limiting. Embodiments may be implemented in further types of computer systems, as would be known to persons skilled in the relevant art(s).

As shown in FIG. 6, computing device 600 may include one or more processors or processor circuits, referred to as processing unit 602, a system memory 604, and a bus 606 that couples various system components including system memory 604 to processing unit 602. Processing unit 602 may comprise an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processing unit 602 may execute program code stored in a computer readable medium, such as program code of operating system 630, application programs 632, other programs 634, etc. Bus 606 represents one or more of any of several types of bus structures, including a memory bus or memory controller, a peripheral bus, an accelerated graphics port, and a processor or local bus using any of a variety of bus architectures.

System memory 604 includes read only memory (ROM) 608 and random access memory (RAM) 610. A basic input/output system 612 (BIOS) is stored in ROM 608.

Computing device 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 630, one or more application programs 2532, other programs 634, and program data 636. Application programs 632 or other programs 634 may include, for example, computer program logic (e.g., computer program code or instructions) for implementing the systems described herein.

A user may enter commands and information into the computing device 600 through input devices such as keyboard 638 and pointing device 640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 602 through a serial port interface 642 that is coupled to bus 606, but may be connected by other interfaces, such as a parallel port, game port, or a universal serial bus (USB).

A display screen 644 is also connected to bus 606 via an interface, such as a video adapter 646. Display screen 644 may be external to or incorporated in computing device 600. Display screen 644 may display information, as well as being a user interface for receiving user commands and/or other information (e.g., by touch, finger gestures, virtual keyboard, etc.). In addition to display screen 644, computing device 600 may include other peripheral output devices (not shown) such as speakers and printers.

Computing device 600 is connected to a network 648 (e.g., the Internet) through an adaptor or network interface 650, a modem 652, or other means for establishing communications over the network. Modem 652, which may be internal or external, may be connected to bus 606 via serial port interface 642, as shown in FIG. 6, or may be connected to bus 606 using another interface type, including a parallel interface.

As used herein, the terms "computer program medium," "computer-readable medium," and "computer-readable storage medium" are used to generally refer to physical hardware media such as the hard disk associated with hard disk drive 614, removable magnetic disk 618, removable optical disk 622, other physical hardware media such as RAMs, ROMs, flash memory cards, digital video disks, zip disks, MEMs, nanotechnology-based storage devices, and further types of physical/tangible hardware storage media (including system memory 604 of FIG. 6). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 632 and other programs 634) may be stored on the hard disk, magnetic disk, optical disk, ROM, RAM, or other hardware storage medium. Such computer programs may also be received via network interface 650, serial port interface 652, or any other interface type. Such computer programs, when executed or loaded by an application, enable computing device 600 to implement features of embodiments discussed herein. Accordingly, such computer programs represent controllers of the computing device 600.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

Methods, systems, and computer program products are described herein for supporting and negotiating multiple (e.g. static) API versions across multiple products. Interoperable programs, such as Microsoft® Edge® and Internet Explorer® browser applications, may provide simultaneous support for multiple versions of an API. An API and program-API adapters may be versioned to manage compatibility for asynchronously developed programs and APIs that may be asynchronously installed and updated in many computing environments. An adapter may comprise a versioned portion of program source code. In-development program code and APIs may be forked to create versioned snapshots of stable interfaces. An "in-development" version of an API and adapters may coexist with versioned APIs and adapters. Compatible version negotiation may occur, for example, during process launch. Negotiation may activate the highest API version supported, for example, when an Edge tab is in Internet Explorer mode.

In an example, a method performed by at least one computing device may comprise, for example, configuring a first program to interact with a second program via an application programming interface (API), by: selecting compatible versions of a first API adapter and a second API adapter from among M versions of the first API adapter that adapts the first program to the API and from among N versions of the second API adapter that adapts the second program to the API; and activating the API with the compatible versions of the first and second API adapters.

In an example, activating the API may comprise activating one of Q versions of the API with the compatible versions of the first and second API adapters.

In an example, the selection may comprise a negotiation performed, for example, over an unversioned API between the first and second programs or between the first and second API adapters.

In an example, the first API adapter may comprise a versioned portion of code of the first program interfaced with an unversioned portion of code of the first program. The second API adapter may comprise a versioned portion of code of the second program interfaced with an unversioned portion of code of the second program.

In an example, the first API adapter may comprise a first application binary interface (ABI). The second API adapter may comprise a second ABI.

In an example, the second program may be integrated with an operating system.

In an example, the method may further comprise, for example, instantiating, by the first program, the second program.

In an example, the method may further comprise, for example, loading, by the second program, the first API adapter in the second program.

In an example, the first program may comprise, for example, a first web browser application. The second program may comprise a second web browser application.

In an example, the method may further comprise, for example, navigating, by the first web browser application, to a webpage that is incompatible with the first web browser application and compatible with the second web browser application; processing the webpage with the second web browser application; and presenting the webpage in a user interface of the first web browser application.

In an example, the method may further comprise, for example, creating each of the M versions of the first API adapter by forking an in-development version of the first API adapter at different stages of development; and creating each of the N versions of the second API adapter by forking an in-development version of the second API adapter at different stages of development.

In an example, selecting compatible versions of a first API adapter and a second API adapter may comprise selecting the in-development versions of the first and second API adapters.

In an example, a system (e.g. a computing environment) may be configured to, for example, configure a first program to interact with a second program via an application programming interface (API), by: selecting compatible versions of a first API adapter and a second API adapter from among M versions of the first API adapter that adapts the first program to the API and from among N versions of the second API adapter that adapts the second program to the API; and activating one of Q versions of the API with the compatible versions of the first and second API adapters.

In an example, the first API adapter may comprise a versioned portion of code of the first program interfaced with an unversioned portion of code of the first program. The second API adapter may comprise a versioned portion of code of the second program interfaced with an unversioned portion of code of the second program.

In an example, the first program may comprise a first web browser application and the second program comprises a second web browser application.

In an example, the computing environment may be further configured to, for example, navigate, by the first web browser application, to a webpage that is incompatible with the first web browser application and compatible with the second web browser application; process the webpage with the second web browser application; and present the webpage in a user interface of the first web browser application.

In an example, a computer-readable storage medium may have program instructions recorded thereon that, when executed by at least one processing circuit, perform a method comprising, for example, configuring a first program to interact with a second program with an application programming interface (API), by: selecting compatible versions of a first API adapter and a second API adapter from among M versions of the first API adapter that adapts the first program to the API and from among N versions of the second API adapter that adapts the second program to the API; activating the API with the compatible versions of the first and second API adapters; and communicating between the first and second programs using the activated API and the compatible versions of the first and second API adapters.

In an example, the first API adapter may comprise a versioned portion of code of the first program interfaced with an unversioned portion of code of the first program. The second API adapter may comprise a versioned portion of code of the second program interfaced with an unversioned portion of code of the second program.

In an example, each of the M versions of the first API adapter may comprise a fork of an in-development version of the first API adapter at different stages of development. Each of the N versions of the second API adapter may comprise a fork of an in-development version of the second API adapter at different stages of development.

In an example, the method performed by the computer-readable storage medium may further comprise, for example, instantiating, by the first program, the second program.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by at least one computing device, comprising:
  configuring a first program to interact with a second program via an application programming interface (API), by:
  selecting compatible versions of a first application binary interface (ABI) and a second ABI from among M versions of the first ABI that adapts the first program to the API and from among N versions of the second ABI that adapts the second program to the API, where M and N are each integer values greater than zero; and
  activating the API with the compatible versions of the first ABI and the second ABI.

2. The method of claim 1, wherein activating the API comprises activating one of Q versions of the API with the compatible versions of the first ABI and the second ABI, where Q is an integer value greater than zero.

3. The method of claim 1, wherein the selection comprises a negotiation performed over an unversioned API between the first and second programs or between the first ABI and the second ABI.

4. The method of claim 1, wherein:
  the first ABI comprises a versioned portion of code of the first program interfaced with an unversioned portion of code of the first program; and
  the second ABI comprises a versioned portion of code of the second program interfaced with an unversioned portion of code of the second program.

5. The method of claim 1, wherein the second program is integrated with an operating system.

6. The method of claim 1, further comprising:
  instantiating, by the first program, the second program.

7. The method of claim 6, further comprising:
  loading, by the second program, the first ABI in the second program.

8. The method of claim 7, wherein the first program comprises a first web browser application and the second program comprises a second web browser application.

9. The method of claim 8, further comprising:
  navigating, by the first web browser application, to a webpage that is incompatible with the first web browser application and compatible with the second web browser application;
  processing the webpage with the second web browser application; and
  presenting the webpage in a user interface of the first web browser application.

10. The method of claim 1, further comprising:
  creating each of the M versions of the first ABI by forking an in-development version of the first ABI at different stages of development; and
  creating each of the N versions of the second ABI by forking an in-development version of the second ABI at different stages of development.

11. The method of claim 10, wherein the selecting compatible versions of a first ABI and a second ABI comprises selecting the in-development versions of the first ABI and the second ABI.

12. A system, comprising:
  a processor; and
  at least one memory that stores instructions configured to be executed by the processor, the instructions configured to perform operations that comprise:
    configuring a first program to interact with a second program via an application programming interface (API), by:
      selecting compatible versions of a first application binary interface (ABI) and a second ABI from among M versions of the first ABI that adapts the first program to the API and from among N versions of the second ABI that adapts the second program to the API, where M and N are each integer values greater than zero; and
      activating one of Q versions of the API with the compatible versions of the first ABI and the second ABI, where Q is an integer value greater than zero.

13. The system of claim 12, wherein:
  the first ABI comprises a versioned portion of code of the first program interfaced with an unversioned portion of code of the first program; and
  the second ABI comprises a versioned portion of code of the second program interfaced with an unversioned portion of code of the second program.

14. The system of claim 12, wherein the first program comprises a first web browser application and the second program comprises a second web browser application.

15. The system of claim 14, wherein the at least one memory further stores instructions configured to perform operations that comprise:
navigating, by the first web browser application, to a webpage that is incompatible with the first web browser application and compatible with the second web browser application;
processing the webpage with the second web browser application; and
presenting the webpage in a user interface of the first web browser application.

16. The system of claim 12, wherein:
each of the M versions of the first ABI comprises a fork of an in-development version of the first ABI at different stages of development; and
each of the N versions of the second ABI comprises a fork of an in-development version of the second ABI at different stages of development.

17. A computer-readable storage medium having program instructions recorded thereon that, when executed by at least one processing circuit, perform a method, the method comprising:
configuring a first program to interact with a second program with an application programming interface (API), by:
selecting compatible versions of a first application binary interface (ABI) and a second ABI from among M versions of the first ABI that adapts the first program to the API and from among N versions of the second ABI that adapts the second program to the API, where M and N are each integer values greater than zero;
activating the API with the compatible versions of the first ABI and the second ABI; and
communicating between the first and second programs using the activated API and the compatible versions of the first ABI and the second ABI.

18. The computer-readable storage medium of claim 17, wherein:
the first ABI comprises a versioned portion of code of the first program interfaced with an unversioned portion of code of the first program; and
the second ABI comprises a versioned portion of code of the second program interfaced with an unversioned portion of code of the second program.

19. The computer-readable storage medium of claim 17, wherein:
each of the M versions of the first ABI comprises a fork of an in-development version of the first ABI at different stages of development; and
each of the N versions of the second ABI comprises a fork of an in-development version of the second ABI at different stages of development.

20. The computer-readable storage medium of claim 19, further comprising:
instantiating, by the first program, the second program.

* * * * *